United States Patent
Yamamoto et al.

[11] Patent Number: 6,047,668
[45] Date of Patent: Apr. 11, 2000

[54] BACKPACK TYPE POWER WORKING MACHINE

[75] Inventors: Takayuki Yamamoto, Tokyo; Mitsutane Chiba, Kodaira; Tatsuhiko Matsubayashi, Kamakura; Satoru Kikuchi, Fussa, all of Japan

[73] Assignee: Kioritz Corporation, Tokyo, Japan

[21] Appl. No.: 09/087,161

[22] Filed: May 29, 1998

[30] Foreign Application Priority Data

Jun. 4, 1997 [JP] Japan ..................... 9-161995

[51] Int. Cl.[7] .................................. F02B 63/02
[52] U.S. Cl. .................... 123/2; 123/195 A; 224/263
[58] Field of Search .................. 123/2, 195 A, 123/262; 224/261, 263, 210, 212

[56] References Cited

U.S. PATENT DOCUMENTS

| | | | |
|---|---|---|---|
| 4,483,070 | 11/1984 | Junkermann | 224/262 |
| 4,662,551 | 5/1987 | Dudley et al. | 224/262 |
| 5,011,058 | 4/1991 | Sapp et al. | 224/261 |
| 5,133,300 | 7/1992 | Miura | 123/2 |
| 5,176,303 | 1/1993 | Franke | 224/261 |
| 5,555,853 | 9/1996 | Bowen et al. | 123/2 |
| 5,716,131 | 2/1998 | Breeding | 224/265 |
| 5,857,439 | 1/1999 | Will et al. | 123/2 |
| 5,894,833 | 4/1999 | Kikuchi et al. | 123/516 |

FOREIGN PATENT DOCUMENTS 2-16587  5/1990  Japan ............... A01D 34/68

*Primary Examiner*—Erick R. Solis
*Attorney, Agent, or Firm*—Michael D. Bednarek; Crowell & Moring LLP

[57] ABSTRACT

A backpack type power working machine includes a movable stopper for restricting the turning angle of an internal combustion engine unit which is supported on a backpack frame so that it turns about a longitudinal axis. As a result, the turning angle restriction of the internal combustion engine unit can be released by just moving the movable stopper, whereby a job efficiency can be improved.

5 Claims, 8 Drawing Sheets

BACKPACK TYPE POWER WORKING MACHINE

BACKGROUND OF THE INVENTION

1. Field of the Invention

The present invention relates to a backpack type power working machine such as a bush cutter, a hedge trimmer and the like, and more specifically, to a backpack type power working machine arranged such that an internal combustion engine unit, for example, a small air-cooled two-cycle gasoline engine, is supported on a backpack frame so that it turns about a longitudinal axis.

2. Description of the Related Art

Operators who carry a backpack frame on their back can conveniently use this type of backpack type power working machines by turning an internal combustion engine unit when necessary and drawing out a working tool, which extends from the internal combustion engine unit, in a direction where they can easily execute a job. According to the backpack type power working machines, a position to which the working tool is drawn out can be suitably changed to the right side or to the left side of the body of the operators so that the operators can easily execute the job depending upon whether the operators are a right-handed person or a left handed-person or in correspondence to the change of various working environments such as an inclination and the like of a working field.

In the backpack type power working machines arranged as described above, if the internal combustion engine unit can be unlimited turned with respect to the backpack frame, there may be caused a trouble that the working tool comes into strong contact with the longitudinal portion of the backpack frame and with the operator when the position to which the working tool is drawn out is changed or while the operator executes the job, to thereby damage the longitudinal portion and injure the operator. To prevent the working tool from coming in contact with the backpack frame and the operator, a first stopper is conventionally fixed to the backpack frame to restrict the turning angle of the internal combustion engine unit within a predetermined allowable angle range.

Further, there is a danger that the exhaust gas port of an exhaust gas muffler constituting the internal combustion engine unit is directed to the operator (backing plate side) and the operator is exposed to the hot exhaust gas from the internal combustion engine unit even within the allowable turning angle range, depending upon a direction of the internal combustion engine unit. To prevent the exhaust gas from being directed to the operator, a second stopper is conventionally detachably disposed to the backpack frame to restrict, for example, the turning angle of the internal combustion engine unit within a safe turning range in the allowable turning angle range. Thus, the operator executes the job by mounting or dismounting the second stopper when necessary.

However, there is a problem that since the job must be interrupted when the second stopper is mounted or dismounted, a working efficiency is deteriorated as well as mounting and dismounting of the second stopper is troublesome.

SUMMARY OF THE INVENTION

An object of the present invention made in view of the above circumstances is to provide a backpack type power working machine capable of promptly and efficiently executing a job.

To achieve the above object, a backpack type power working machine according to the present invention comprises an internal combustion engine unit supported on a backpack frame so as to turn about a longitudinal axis; and a movable stopper for restricting the turning angle of the internal combustion engine unit within a predetermined range.

According to the above arrangement, the restriction of the turning angle of the internal combustion engine unit can be released by just moving the movable stopper when necessary. Accordingly, an operation for releasing the restriction of the turning angle of the internal combustion engine unit can be simply and promptly executed, whereby a working efficiency can be improved.

A backpack type power working machine according to the present invention comprises an internal combustion engine unit supported on a backpack frame so as to turn about a longitudinal axis; and a movable stopper for restricting the turning of the internal combustion engine unit so that the exhaust gas from the internal combustion engine unit is not directed to an operator who carries the backpack frame on its back.

With this arrangement, the backpack type power working machine can be operated safely because the exhaust gas from the internal combustion engine unit is prevented from being directed to the operator. Further, since the restriction of the turning angle can be released by just moving the movable stopper when necessary, a turning angle regulation releasing operation can be simply and promptly executed, whereby the working efficiency can be improved.

A backpack type power working machine according to the present invention comprises an internal combustion engine unit supported on a backpack frame so as to turn about a longitudinal axis within a predetermined allowable turning angle range; and a movable stopper for restricting the turning angle of the internal combustion engine unit within a safe turning angle range in the allowable turning angle range so that the exhaust gas from the internal combustion engine unit is not directed to an operator who carries the backpack frame on its back.

Further, a backpack type power working machine according to the present invention comprises an internal combustion engine unit supported on a backpack frame so as to turn about a longitudinal axis; a working tool extending from the internal combustion engine unit and used by an operator who carries the backpack frame on its back with its drawn-out position suitably changed by the operator; fixed stoppers for restricting the turning angle of the internal combustion engine unit within an allowable turning angle range so that the working tool does not come into contact with the backpack frame and the operator; and a movable stopper for restricting the turning angle of the internal combustion engine unit within a safe turning angle range in the allowable turning angle range so that the exhaust gas from the internal combustion engine unit is not directed to the operator.

The operator turns the internal combustion engine unit in accordance with its whip hand and working environments and executes a job by drawing out the working tool forward selectively from its right side or left side. At that time, the working tool is prevented from coming into contact with the backpack frame and the operator by the action of the fixed stoppers. Further, the turning angle range of the internal combustion engine unit can be optionally changed to the safe turning angle range and to the allowable turning angle range by just operating the movable stopper when necessary. Accordingly, the turning angle range of the internal combustion engine unit can be simply and promptly changed, whereby a job can be efficiently executed.

In an backpack type power working machine according to the present invention, the movable stopper is always urged so that it advances to a turn restricting position where it is abutted against stopper locking means of the internal combustion engine unit as well as the movable stopper is manually operated so that it is retreated from the turn restricting position to a turn restriction releasing position where it is not abutted against the stopper locking means.

The above arrangement can simply arrange the backpack type power working machine and lower its cost.

In a backpack type power working machine according to the present invention, the movable stopper is always urged so that it advances to the turn restricting position where it is abutted against stopper locking means of the internal combustion engine unit as well as the movable stopper is manually operated by the operator who carries the backpack frame on its back so that it is retreated from the turn restricting position to the turn restriction releasing position where it is not abutted against the stopper locking means.

The above arrangement can simply arrange the backpack type power working machine and lower its cost. Further, since the movable stopper can be operated in the sate that the operator carries the backpack frame on his back, a job can be more promptly and efficiently executed.

In a backpack type power working machine according to the present invention, when the stopper locking means of the internal combustion engine unit enters the turn restricting range restricted by the movable stopper, the movable stopper is forcibly released from the turn restricting position by being pushed by the stopper locking means.

With this arrangement, when the stopper locking means of the internal combustion engine unit enters the turn restricting range restricted by the movable stopper, the movable stopper need not be operated and is manually operated only when the stopper locking means is released from the turn restricting range restricted by the movable stopper. Thus, a frequency at which the movable stopper is manually operated is reduced to a half of a conventional arrangement, whereby a job can be more promptly and more efficiently executed.

In a backpack type power working machine according to the present invention, the movable stopper turns along the turning plane of the stopper locking means.

According to this arrangement, the movable stopper can be operated more smoothly and more reliably.

DESCRIPTION OF THE PREFERRED EMBODIMENTS

FIG. 1 to FIG. 6 shows a first embodiment of the present invention.

Figure 1:
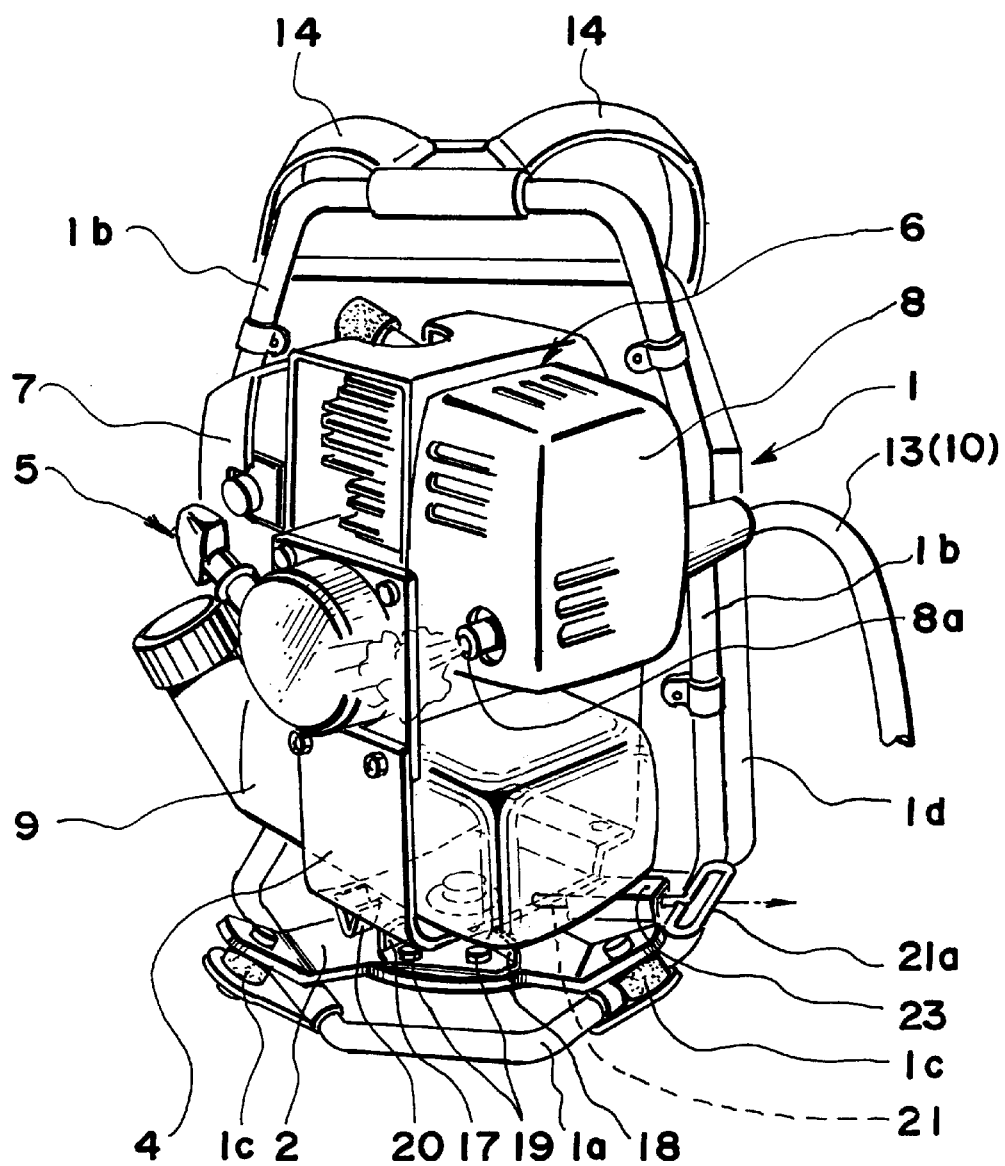
FIG. 1 is a perspective view showing a portion, where an internal combustion engine unit is mounted, of a backpack type bush cutter as an example of a backpack type power working machine according to a first embodiment of the present invention.
Figure 2:
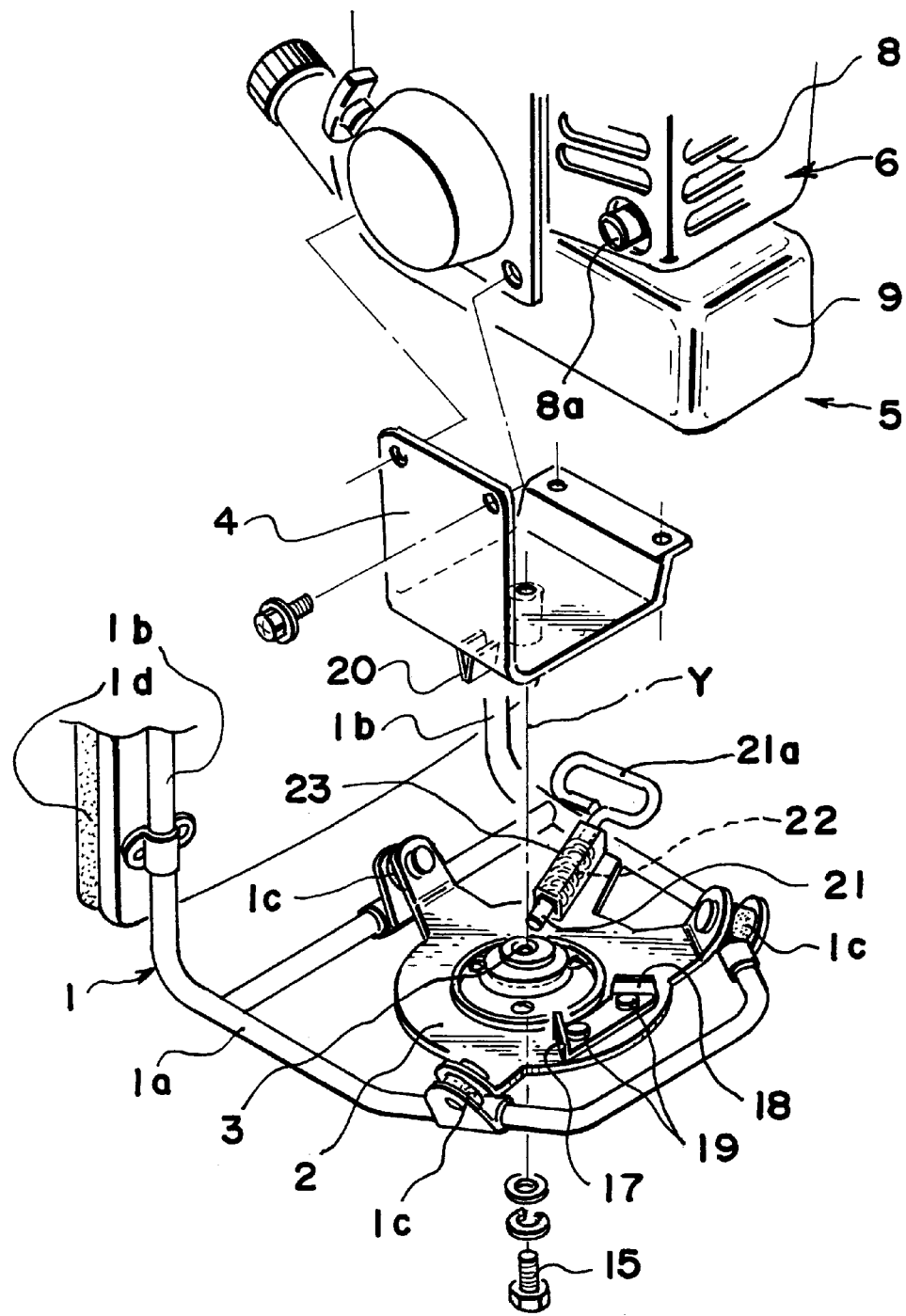
FIG. 2 is an exploded perspective view of a main portion of FIG. 1.

As shown in the drawings, a backpack type bush cutter as an example of a backpack type power working machine of the present invention includes a backpack frame 1 having a backing plate 1d. As shown in FIGS. 1 and 2, a base plate 2 is horizontally mounted on the backward extending horizontal portion 1a of the backpack frame 1 through vibration preventing rubbers 1c, 1c. As shown in FIG. 2, an engine support plate 4 is disposed on the base plate 2 through a ball bearing 3 so that it can turn about a vertical longitudinal axis Y and turnably coupled with the base plate 2 by a mounting bolt 15.

An internal combustion engine unit 5, which includes a small air-cooled two-cycle internal combustion engine 6, an air cleaner 7, an exhaust gas muffler 8 and a fuel tank 9 is supported on the engine support plate 4 as a unit.

Figure 6:
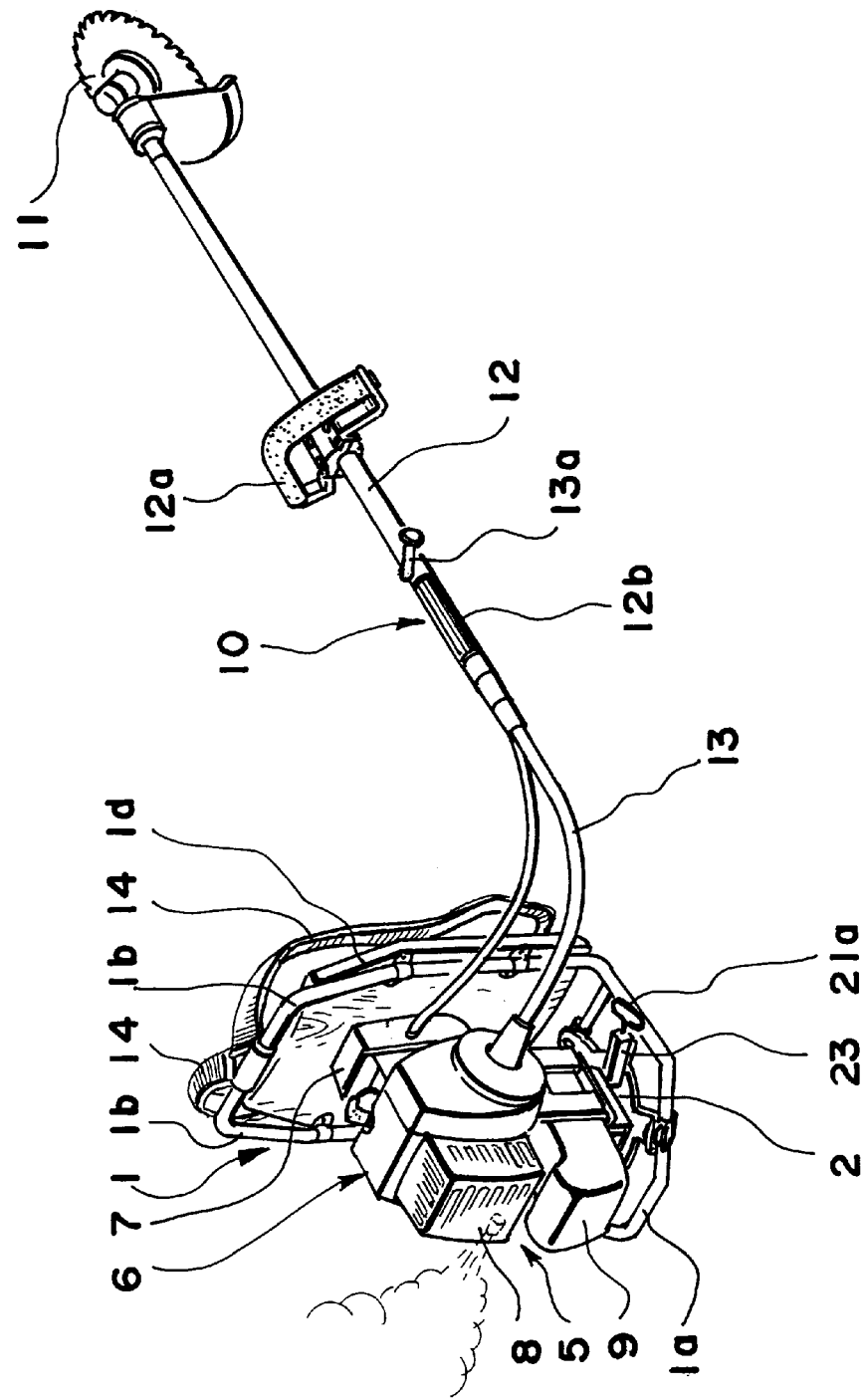
FIG. 6 is an overall perspective view of the backpack type bush cutter shown in FIG. 1.

As shown in FIG. 6, a working tool 10 extends from the internal combustion engine unit 5. An operator 16, who carries the backpack frame 1 on its back, executes a job by holding the working tool 10 with its hands. The working tool 10 in the illustrated example is a bush cutting tool. The bush cutting tool 10 includes a bush cutter 11 driven by the engine 6, an operating rod 12 having the bush cutter 11 at the extreme end thereof, a transmission shaft (not shown) inserted into the operating rod 12 to transmit the power from the engine 6 to the bush cutter 11 and a flexible tube 13 for covering a flexible shaft (not shown) which is coupled with the transmission shaft between the engine 6 and the rear end of the operating rod 12.

After the start of the engine 6, the operator 16 carries the backpack frame 1 on his back by a pair of right and left carrying bands 14, 14, holds the handles 12a, 12b of the operating rod 12 with its hands, operates a throttle lever 13a with its finger and executes a bush cutting job by swinging the bush cutter 11 rightward and leftward.

In the backpack type bush cutter arranged as described above, a pair of right and left stoppers 17, 18 are fixed on a circumference about the longitudinal axis Y on the base plate 2 as shown in FIG. 2. The stoppers 17, 18 are abutted against a stopper locking projection 20 as stopper locking means mounted on the lower surface of the engine support plate 4 on which the internal combustion engine unit 5 is mounted. Thus, the stoppers 17, 18 restrict the tuning angle of the internal combustion engine unit 5 within a predetermined allowable turning angle range α by restricting that the internal combustion engine unit 5 excessively turns about the longitudinal axis Y (see FIG. 7).

More specifically, the stoppers 17, 18 restrict the turning range of the internal combustion engine unit 5 to prevent, when a position to which the working tool 10 is drawn out is changed by turning the internal combustion engine unit 5, the flexible tube 13 of the working tool 10 from being struck against the pair of right and left longitudinal portions 1b, 1b of the backpack frame 1 and against the operator 16.

The fixed stoppers 17, 18 are formed of an integral plate and mounted on the base plate 2 rearwardly of the ball bearing 3 by bolts 19, 19. The stopper locking projection 20, which is abutted against each of the stoppers 17, 18 from the outside thereof, projects downward from a proper position of the lower surface of the engine support plate 4.

A function of the stoppers 17, 18 and the stopper locking projection 20 will be more specifically described below.

Figure 3:
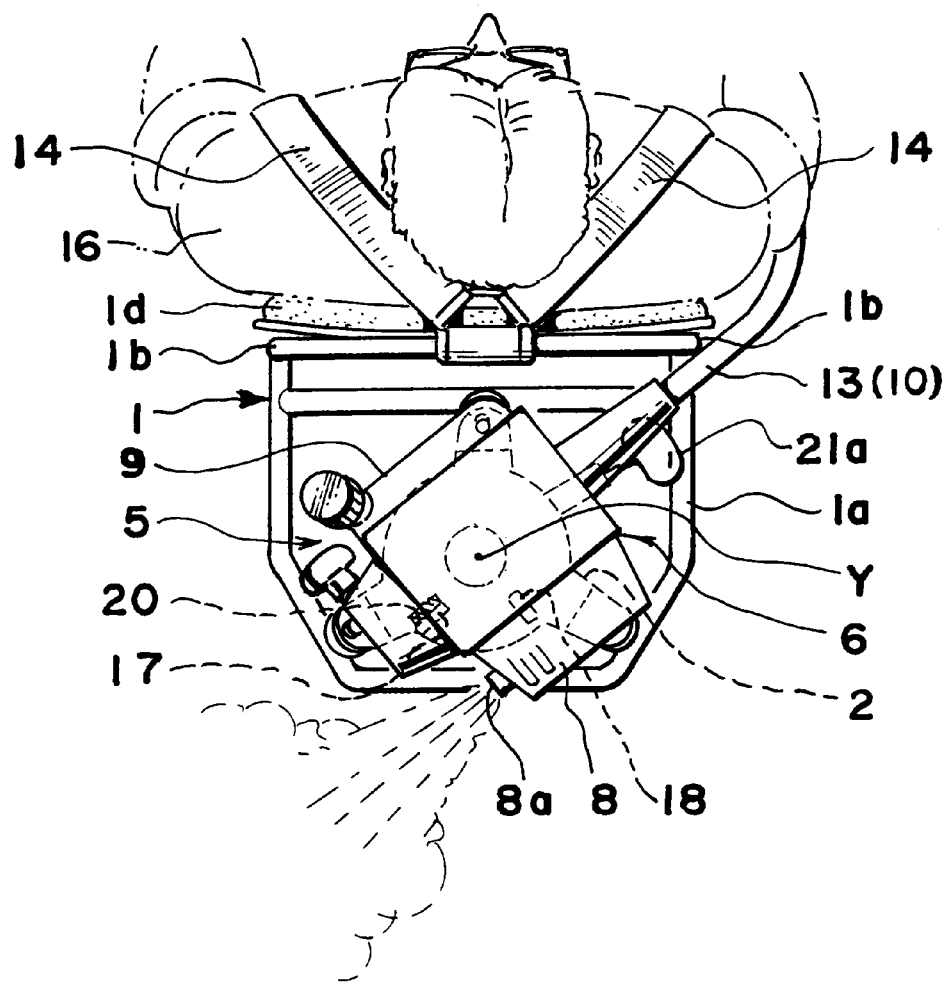
FIG. 3 is a schematic plan view showing the backpack type bush cutter used in a state that the internal combustion engine unit is turned to the right with respect to a backpack frame.

FIG. 3 shows an ordinary operating state of the backpack type bush cutter which is generally called a right-side operating state. In this case, the working tool 10 is drawn out to the right side of the body of the operator 16 who carries the backpack frame 1 on its back.

In the right-side operating state, the stopper locking projection 20 is abutted against the outside surface of the left stopper 17 to thereby prevent the internal combustion engine unit 5 from further turning leftward. In this state, the flexible tube 13 is prevented from being strongly abutted against the right longitudinal portion 1b of the backpack frame 1 and the operator 16.

Figure 4:
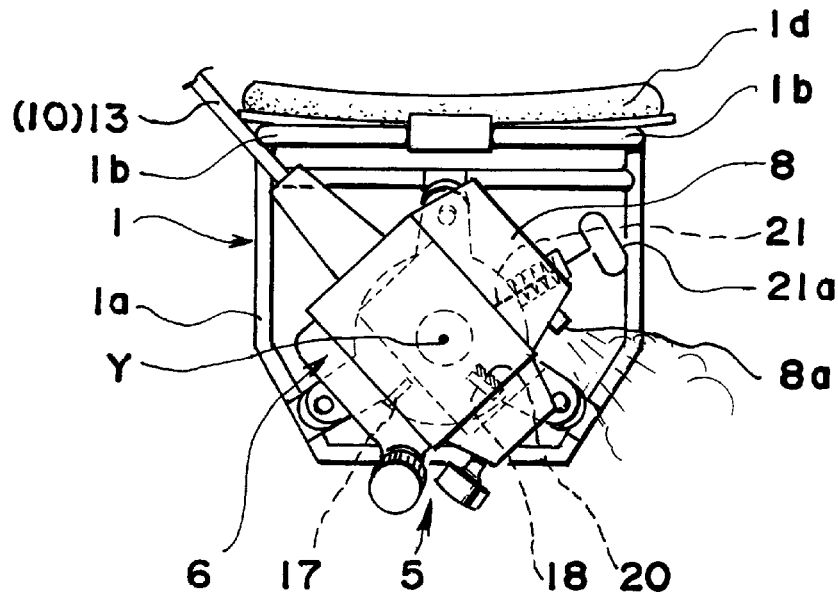
FIG. 4 is a is a schematic plan view showing the backpack type bush cutter used in a state that the internal combustion engine unit is turned to the left with respect to the backpack frame.

Whereas, FIG. 4 shows an operating state of the backpack type bush cutter which is generally called a left-side operating state. In this case, the working tool 10 is drawn out to the left side of the body of the operator 16 who carries the backpack frame 1 on its back.

In the left-side operating state, the stopper locking projection 20 is abutted against the outside surface of the right stopper 18 to thereby prevent the internal combustion engine unit 5 from furthest turning rightward. In this state, the flexible tube 13 is prevented from being strongly abutted against the left longitudinal portion 1b of the backpack frame 1 and the operator 16.

In the left-side operating state shown in FIG. 4, however, the internal combustion engine unit 5 is not restricted to turn to the left. Thus, there is a possibility that an exhaust gas port 8a of the exhaust gas muffler 8 is directed to the backside of the operator 16 while cutting bushes by swinging the working tool 10 rightward and leftward due to the disposition of the respective components of the internal combustion engine unit 5.

More specifically, in this type of the working machines, the respective components of the internal combustion engine unit 5 are usually disposed so that the exhaust gas port 8a of the exhaust gas muffler 8 is located farthest from just behind the operator 16 in the ordinary operating state as shown in FIG. 3. This arrangement is made in view of that the backpack type bush cutter is most often used by right-handed operators in the right-side operating state (the ordinary operating state). Therefore, the exhaust gas port 8a of the exhaust gas muffler 8 is not directed to the backside of the operator 16 in the ordinary operating state except an extraordinary case.

Figure 5:
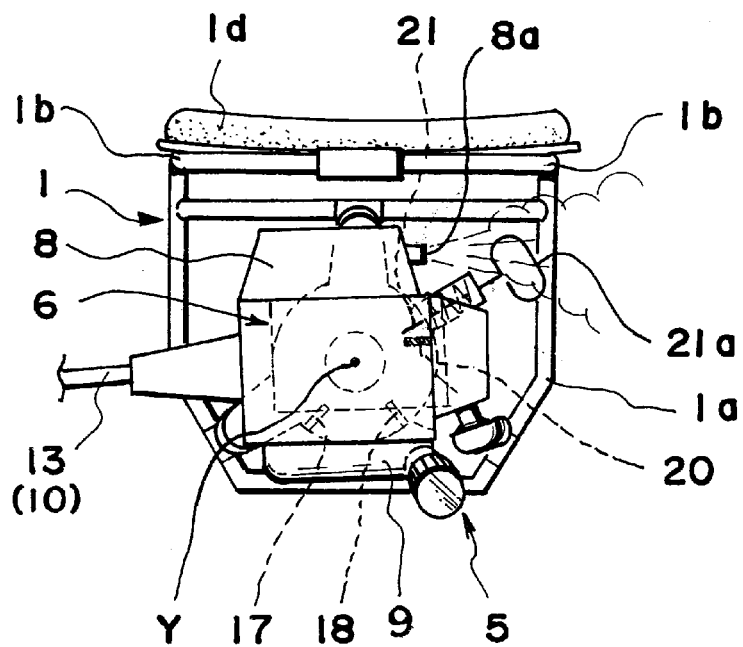
FIG. 5 is a schematic plan view showing a state of the internal combustion engine unit turned with respect to the backpack frame.

When the operator 16 greatly swings the extreme end of the working tool 10 to the left side in the bush cutting job executed in the left-side operating state shown in FIG. 4, the internal combustion engine unit 5 is greatly turned accordingly. As a result, the exhaust gas port 8a of the exhaust gas muffler 8 is located in the vicinity of the back of the operator 16 as shown in FIG. 5. When the working tool 10 is furthermore swung at that time, the exhaust gas port 8a of the exhaust gas muffler 8 is directed to the operator 16 and he is exposed to a hot exhaust gas.

In a conventional arrangement, when the working tool 10 is to be changed to the left-side operating state, the backpack frame 1 is put down from the shoulder of the operator 16 once; the working tool 10 is drawn out to the left of the backpack frame 1 by turning the working tool 10 and the internal combustion engine unit 5 to the right; and thereafter a second stopper, which is abutted against the stopper locking projection 20 and prevents the internal combustion engine unit 5 from turning to the left more than a predetermined angle, is fixed to a predetermined position of the base plate 2 with a screw.

However, when the second topper is fixed with the screw once, even if it is attempted to change the working tool 10 to the previous right-side operating state in accordance with the change of various working circumferences such as an inclining direction and an inclining angle of a working field, and the like, the change of the direction of the working tool 10 is prevented by the second stopper in the state as it is. Thus, the operator must remove the second stopper by interrupting the bush cutting job. Accordingly, the conventional method has a problem that the mounting and dismounting job of the second stopper is troublesome as well as the bush cutting job is inefficient.

To solve the above problem, the first embodiment attaches a movable stopper 21 on the base plate 2 in place of the detachable second stopper as shown in FIGS. 1 and 2. In the left-side operating state, the movable stopper 21 is abutted against the stopper locking projection 20 and restricts the turning angle of the internal combustion engine unit 5 within a predetermined safe turning angle range $\beta$ in the allowable turning angle range a (see FIG. 7). With this arrangement, the exhaust gas from the internal combustion engine unit 5 is not directed to the backpack frame 1 side in the left-side operating state.

The movable stopper 21 in the first embodiment is formed to a rod shape and disposed to move freely in its lengthwise direction along the radial direction of an arc about the longitudinal axis Y. A cylinder 23, which extends in the radial direction of the arc, is fixed on the base plate 2 and the movable stopper 21 is inserted into the cylinder 23.

The movable stopper 21 is always urged inwardly of the base plate 2 by a spring 22 inserted into the cylinder 23. The inside end of the movable stopper 21 advances onto the turning track of the stopper locking projection 20 and is ordinarily located at a turn restricting position on the turning track. When the movable stopper 21 is pulled outwardly by a finger which is put in the manual operating ring 21a formed to the outside end thereof, it retreats to a turn restriction releasing position which is located out of the turning track of the stopper locking projection 20. When the finger is removed from the manual operating ring 21a, the movable stopper 21 is returned to the turn restricting position again by the urging force of the spring 22.

The movable stopper 21 is located within the easy reach of the operator 16 and disposed in a direction where the operator 16 can easily pull out it to ensure that the operator 16 can easily operate the movable stopper 21 by reaching a hand behind its back while carrying the backpack frame 1 on its back.

When the operator 16, who cuts bushes in the right-side operating state shown in FIG. 3, intends to change the position of the working tool 10 to the left-side operating position shown in FIG. 4, the operator 16 puts the working tool 10 on the ground or the like while carrying the backpack frame 1 on its back; releases hands from the handles 12a, 12b once; pulls out the manual operating ring 21a of the movable stopper 21 outwardly on the right side by reaching the right hand behind its back; and turns to the left. Then, the operator 16 releases the manual operating ring 21a after the stopper locking projection 20 passes to the right side stopper 18 without being locked to the movable stopper 21.

In the thus achieved left-side operating state, the turning angle range of the stopper locking projection 20 is restricted within the safe turning angle range β between the right side stopper 18 and the movable stopper 21. The turning angle range of the internal combustion engine unit 5 is restricted within the safe turning angle range β accordingly. As a result, even if the operator 16 greatly swings the extreme end of the working tool 10 to the left while cutting bushes in the left-side operating state, the exhaust gas port 8*a* of the exhaust gas muffler 8 is not directed to the backpack frame 1 beyond the position shown in FIG. 5 so that the operator 16 is prevented from being exposed to the hot exhaust gas.

When the working tool 10 is to be returned to the right-side operating state, it is sufficient that the operator 16 puts the working tool 10 on the ground like the above-mentioned; pulls out the movable stopper 21; and turns to the right contrary to the above.

Since the operator 16 can easily change the direction in which the working tool 10 is pulled out while carrying the backpack frame 1 on its back as described above, a bush cutting efficiency can be improved as compared with the conventional method.

Next, a second embodiment of the present invention will be described below with reference to FIG. 7.

Figure 7:
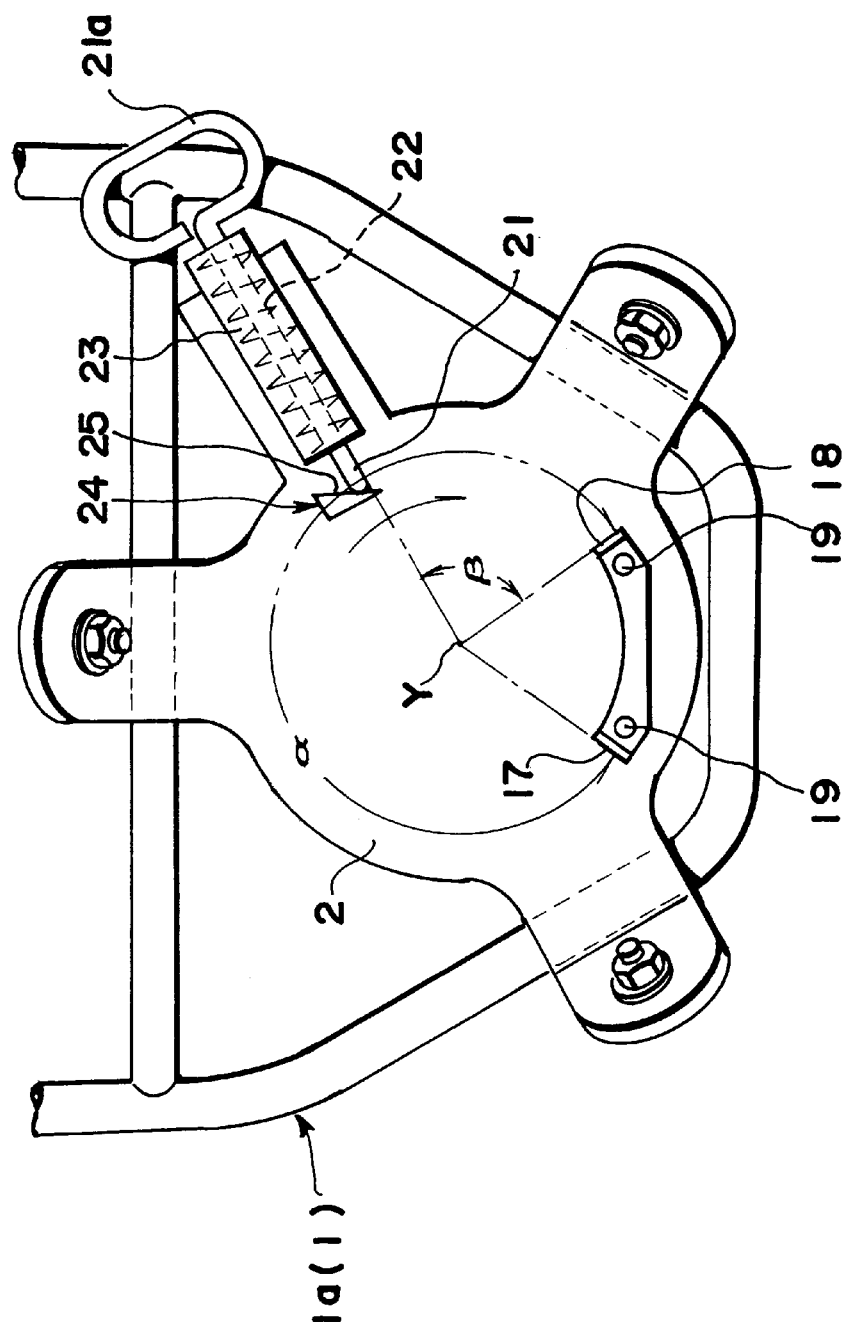
FIG. 7 is a plan view of a base plate of a second embodiment of the present invention.

FIG. 7 shows a main portion of a working machine according to the second embodiment. The second embodiment is arranged similarly to the first embodiment except that it is provided with a stopper locking projection 24 that is formed to a shape different from that of the stopper locking projection 20 in the first embodiment.

The surface 25 of the stopper locking projection 24, which is abutted against the movable stopper 21 when the stopper locking projection 24 enters the turn restricting region (the safe turning angle range β) restricted by the movable stopper 21, is formed to a slope to permit the movable stopper 21 to run on to the surface 25 and retreat. With this arrangement, when the operator 16 puts the working tool 10 on the ground or the like and turns to the left (at that time, the stopper locking projection 24 relatively turns in the right direction as shown by an arrow in FIG. 7) to change the working tool 10 to the left-side operating state, the movable stopper 21 is forcibly released from the turn restricting position by being pressed by the sloped surface 25 of the stopper locking projection 24. Thus, the movable stopper 21 need not be manually operated. As a result, the operator 16 can more easily change a position to which the working tool 10 is drawn out.

Figure 8:
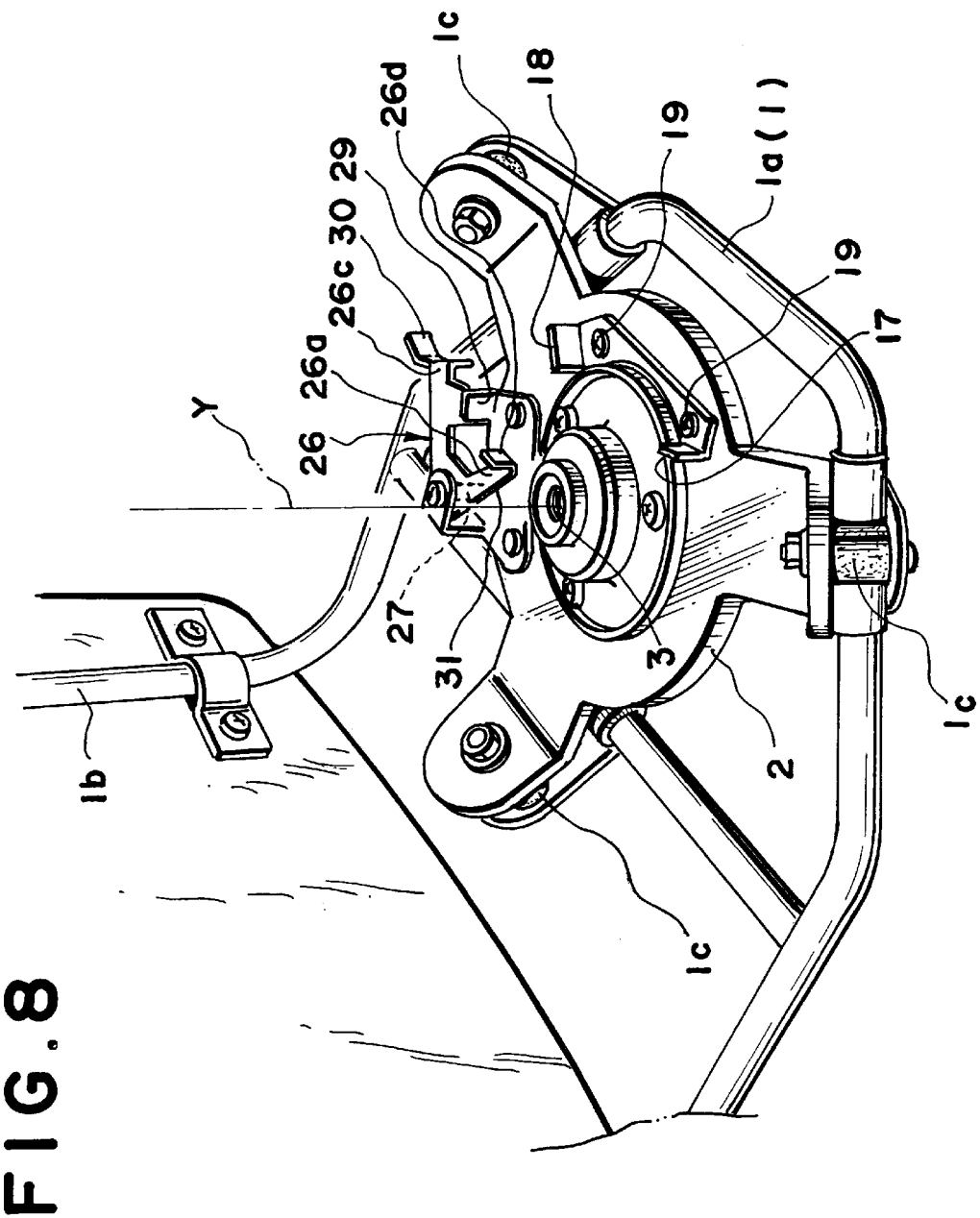
FIG. 8 is a perspective view of a base plate of a third embodiment of the present invention.

Next, a third embodiment of the present invention will be described with reference to FIGS. 8 and 9.

The third embodiment is arranged similarly to the first embodiment except that it is provided with a movable stopper 26 arranged differently from the movable stopper 21 of the first embodiment.

The movable stopper 26 of the third embodiment is turnably supported on the base plate 2 with a pin 27 extending in parallel with the longitudinal axis Y and can be turned along the turning plane of the stopper locking projection 20. The movable stopper 26 is composed of a sheet having an approximate V-shape when viewed from an upper side and the pin 27 is inserted into the bent portion 26*b* thereof.

Figure 9:
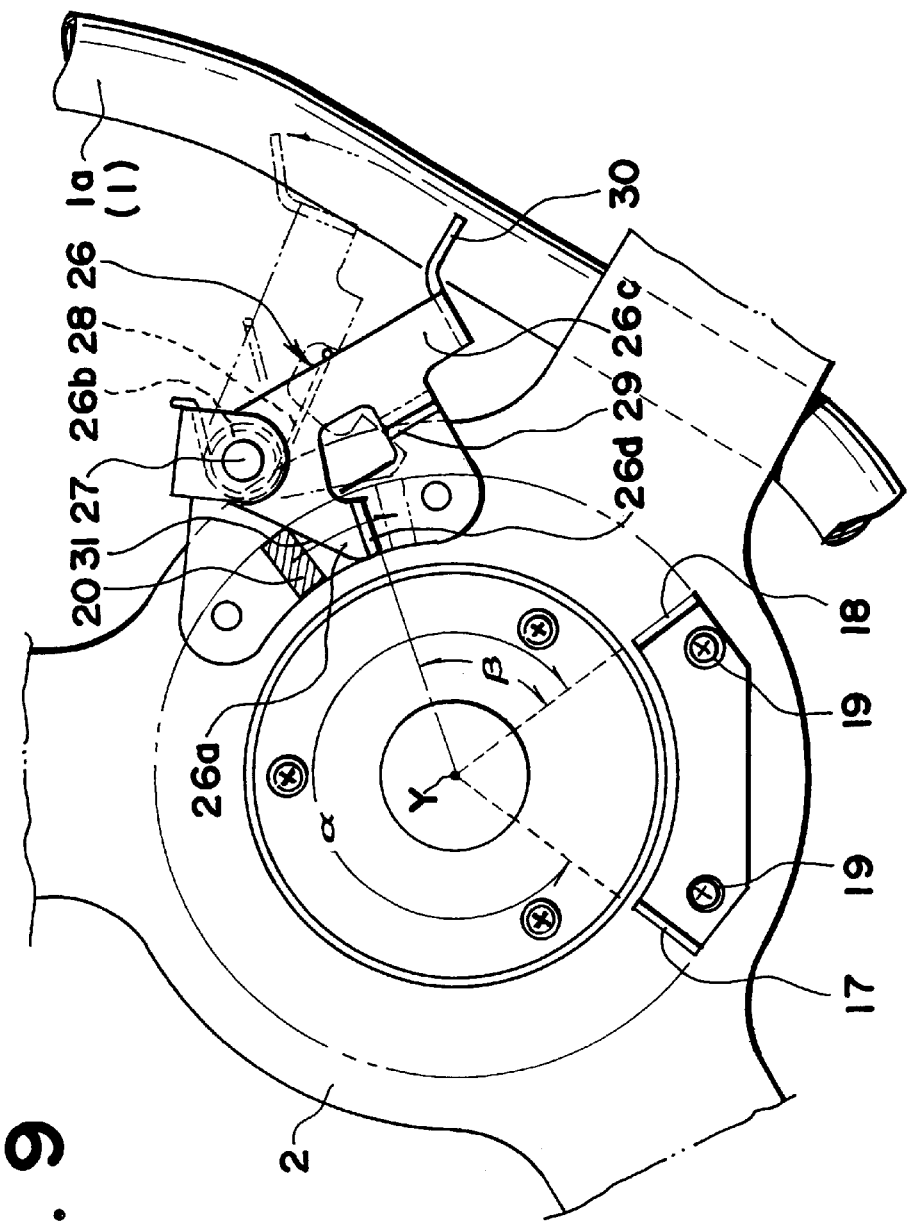
FIG. 9 is a plan view of a main portion of FIG. 8.

A swing end 26*a* of the movable stopper 26 is urged clockwise in FIG. 9 by a spring 28 wound around the pin 27 so that it swings and advances onto the turning track of the stopper locking projection 20. A movable stopper receiver 29, which is abutted against the movable stopper 26 and receives the urging force of the spring 28, is fixed to the base plate 2 at a position where it does not get in way of the turning of the stopper locking projection 20. The swing end 26*a* of the movable stopper 26 is normally stopped at a turn restricting position on the turning track of the stopper locking projection 20 (the position shown by a solid line in FIG. 9).

On the other hand, a manual operation unit 30 is formed to the other swing end 26*c* of the movable stopper 26 integrally therewith. The operator 16 uses the manual operation part 30 to manually swing and retreat the swing end 26*a* to a turn restriction releasing position which is out of the turning track of the stopper locking projection 20 (the position shown by a two-dot-and-dash-line in FIG. 9) against the urging force of the spring 28. The manual operation part 30 is disposed within a range to which the hand of the operator 16 can easily reach as well as in a direction where the operator 16 can easily swing and retract the movable stopper 26 to ensure that the operator 16 can easily operate the manual operation part 30 by reaching its hand behind its back while carrying the backpack frame 1 on its back.

According to the third embodiment, when the operator 16 puts the working tool 10 on the ground or the like and turns to the left to change the working tool 10 to the left-side-operating-state (at that time, the stopper locking projection 20 relatively turns in the right direction as shown in an arrow in FIG. 9), the swing end 26a of the movable stopper 26 is automatically pushed out outwardly from the turn restricting position by the stopper locking projection 20. The movable stopper 26 need not be manually operated due to the above arrangement. Accordingly, a position to which the working tool 10 is drawn out can be more easily changed likewise the second embodiment.

Further, since the movable stopper 26 can be freely turned along the turning plane of the stopper locking projection 20, the automatic retreating motion of the movable stopper 26 can be more smoothly and more reliably executed when the stopper locking projection 20 enters the turn restricting region (the safe turning angle range β) restricted by the movable stopper 26.

Since a side surface 31 of the movable stopper 26, which is abutted against the stopper locking projection 20, is formed to a slope inclined in a direction where the stopper locking projection 20 passes, the movable stopper 26 can be automatically retreated more smoothly and more reliably when the stopper locking projection 20 enters the turn restricting range (the safe turning angle range β) restricted by the stopper receiving portion 26*d* of the movable stopper 26 and the right stopper 18.

The stopper locking projection 20 can be released from the safe turning angle range β in such a manner that the operator 16 manually swings the movable stopper 26 by putting its finger to the manual operation part 30 so that the swing end 26*a* of the movable stopper 26 retreats to the turn restriction releasing position.

What is claimed is:

1. A backpack type power working machine comprising:
   an internal combustion engine unit supported on a backpack frame so as to turn about a longitudinal axis; and
   a movable stopper for restricting the turning angle of said internal combustion engine unit within a predetermined range;
   wherein the movable stopper is always urged so that it advances to a turn restricting position where it is abutted against stopper locking means of said internal combustion engine unit as well as said movable stopper being manually operated so that it is retreated from the turn restricting position to a turn restriction releasing position where it is not abutted against said stopper locking means;

wherein when said stopper locking means of said internal combustion engine unit enters the turn restricting range restricted by said movable stopper, said movable stopper is forcibly released from the turn restricting position by being pushed by said stopper locking means.

2. A backpack type power working machine, according to claim 1 wherein the movable stopper restricts the turning of said internal combustion engine unit so that the exhaust gas from said internal combustion engine unit is not directed to an operator who carriers the backpack frame on its back.

3. A backpack type power working machine according to claim 1, wherein said movable stopper turns along the turning plane of said stopper locking means.

4. A backpack type power working machine, comprising:

an internal combustion engine unit supported on a backpack frame so as to turn about a longitudinal axis;

a working tool extending from said internal combustion engine unit and used by an operator who carries the backpack frame on its back with its drawn-out position suitably changed by the operator;

fixed stoppers for restricting the turning angle of said internal combustion engine unit within an allowable turning angle range so that the working tool does not come into contact with the backpack frame and the operator; and a movable stopper for restricting the turning angle of said internal combustion engine unit within a safe turning angle range in the allowable turning angle range so that the exhaust gas from said internal combustion engine unit is not directed to the operator;

the movable stopper being always urged so that it advances to a turn restricting position where it is abutted against stopper locking means of said internal combustion engine unit as well as said movable stopper is manually operated so that it is retreated from the turn restricting position to a turn restriction releasing position where it is not abutted against said stopper locking means;

wherein said stopper locking means of said internal combustion engine unit enters the turn restricting range restricted by said movable stopper, said movable stopper is forcibly released from the turn restricting position by being pushed by said stopper locking means.

5. A backpack type power working machine according to claim 4, wherein said movable stopper turns along the turning plane of said stopper locking means.

* * * * *